US012771915B2

(12) United States Patent
Moon et al.

(10) Patent No.: US 12,771,915 B2
(45) Date of Patent: Oct. 20, 2026

(54) COOKING DEVICE FOR HEATING FOOD BY USING A GRILL HEATER

(71) Applicant: Samsung Electronics Co., Ltd., Suwon-si (KR)

(72) Inventors: Yunwon Moon, Suwon-si (KR); Sungkoo Cho, Suwon-si (KR); Jihyung Ha, Suwon-si (KR); Sangyong Lee, Suwon-si (KR); Kyungah Chang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 384 days.

(21) Appl. No.: 18/528,034

(22) Filed: Dec. 4, 2023

(65) Prior Publication Data

US 2024/0107140 A1 Mar. 28, 2024

Related U.S. Application Data

(63) Continuation of application No. PCT/KR2023/013944, filed on Sep. 15, 2023.

(30) Foreign Application Priority Data

Sep. 15, 2022 (KR) ........................ 10-2022-0116667
Feb. 23, 2023 (KR) ........................ 10-2023-0024591
Sep. 14, 2023 (KR) ........................ 10-2023-0122670

(51) Int. Cl.
*H04N 23/52* (2023.01)
*F24C 7/06* (2006.01)
(Continued)

(52) U.S. Cl.
CPC ........... *H04N 23/52* (2023.01); *F24C 15/008* (2013.01); *F24C 7/067* (2013.01); *H04N 23/56* (2023.01)

(58) Field of Classification Search
CPC ...... H04N 23/52; H04N 23/56; F24C 15/008; F24C 7/067; F24C 7/085; F24C 7/08; F27D 2021/026
(Continued)

(56) References Cited

U.S. PATENT DOCUMENTS 6,630,655 B2 10/2003 Fukunaga et al.
6,930,294 B2 8/2005 Kim
(Continued)

FOREIGN PATENT DOCUMENTS

CN 113143049 A 7/2021
EP 3 872 403 A1 9/2021
(Continued)

OTHER PUBLICATIONS

Extended European Search Report dated May 22, 2025 for European Application No. 23865906.4.
(Continued)

*Primary Examiner* — Vivek K Shirsat
(74) *Attorney, Agent, or Firm* — STAAS & HALSEY LLP

(57) ABSTRACT

A cooking device includes a main body, a cooking chamber inside the main body, a grill heater provided in an upper portion of the cooking chamber and including a plurality of straight sections arranged in parallel and a plurality of curved sections connecting the plurality of straight sections, a camera module disposed above the grill heater and configured to photograph the inside of the cooking chamber, and first and second lighting modules disposed on both sides of the camera module above the grill heater and configured to radiate light toward the inside of the cooking chamber. Portions of at least some of the plurality of straight sections and portions of at least some of the plurality of curved sections are detour sections bypassing a photographing area
(Continued)

of the camera module, a light irradiation area of the first lighting module, and a light irradiation area of the second lighting module so that the grill heater does not interfere with the photographing area of the camera module, the light irradiation area of the first lighting module, and the light irradiation area of the second lighting module.

20 Claims, 14 Drawing Sheets

(51) Int. Cl.
*F24C 15/00* (2006.01)
*H04N 23/56* (2023.01)

(58) Field of Classification Search
USPC .................................................... 126/273 R
See application file for complete search history.

(56) References Cited

U.S. PATENT DOCUMENTS

| | | | |
|---|---|---|---|
| 10,398,260 B2 | 9/2019 | Park et al. | |
| 11,274,833 B2 | 3/2022 | Jang et al. | |
| 12,429,286 B2* | 9/2025 | Luetkenhaus | F27D 21/02 |
| 2009/0032521 A1 | 2/2009 | Kim et al. | |
| 2016/0327279 A1 | 11/2016 | Bhogal et al. | |
| 2018/0058702 A1* | 3/2018 | Jang | F24C 15/322 |
| 2021/0018182 A1 | 1/2021 | Jang et al. | |
| 2021/0341152 A1 | 11/2021 | Johnson et al. | |
| 2021/0401215 A1 | 12/2021 | Kwon et al. | |
| 2021/0401223 A1 | 12/2021 | Han et al. | |
| 2022/0163214 A1 | 5/2022 | Shinohara et al. | |
| 2024/0053025 A1 | 2/2024 | Park | |
| 2025/0035315 A1* | 1/2025 | Xiao | F24C 7/085 |
| 2025/0123004 A1 | 4/2025 | Jang et al. | |

FOREIGN PATENT DOCUMENTS

| | | | |
|---|---|---|---|
| EP | 3 885 655 | A1 | 9/2021 |
| JP | 2021-103038 | A | 7/2021 |
| KR | 10-2001-0104621 | | 11/2001 |
| KR | 10-2004-0048276 | | 6/2004 |
| KR | 10-2017-0106143 | A | 9/2017 |
| KR | 10-2018-0025787 | A | 3/2018 |
| KR | 10-2018-0036448 | | 4/2018 |
| KR | 10-2021-0083041 | A | 7/2021 |
| KR | 10-2366006 | B1 | 2/2022 |
| KR | 10-2022-0049437 | | 4/2022 |
| KR | 10-2022-0049867 | A | 4/2022 |
| KR | 10-2022-0059726 | | 5/2022 |
| KR | 10-2022-0073638 | | 6/2022 |
| KR | 10-2022-0098482 | A | 7/2022 |
| KR | 10-2022-0112419 | A | 8/2022 |
| WO | WO 2007/141304 | A2 | 12/2007 |
| WO | WO 2018/044067 | A1 | 3/2018 |
| WO | WO 2019/090452 | A1 | 5/2019 |
| WO | WO 2022/145612 | A1 | 7/2022 |

OTHER PUBLICATIONS

International Search Report and Written Opinion of the International Searching Authority dated Oct. 23, 2023 for International Application No. PCT/KR2023/010385.
International Search Report and Written opinion of the International Searching Authority dated Dec. 20, 2023 for International Application No. PCT/KR2023/013944.

* cited by examiner

COOKING DEVICE FOR HEATING FOOD BY USING A GRILL HEATER

CROSS-REFERENCE TO RELATED APPLICATIONS

This application is a continuation application, under 35 U.S.C. § 111(a), of International Application No. PCT/KR2023/013944 filed on Sep. 15, 2023, which claims priority under 35 U.S.C. § 119 to Korean Patent Application No. 10-2022-0116667, filed on Sep. 15, 2022, Korean Patent Application No. 10-2023-0024591, filed on Feb. 23, 2023, and Korean Patent Application No. 10-2023-0122670, filed on Sep. 14, 2023, in the Korean Intellectual Property Office, the disclosures of which are incorporated by reference herein in their entireties.

TECHNICAL FIELD

The disclosure relates to a cooking device that heats food by using a grill heater.

BACKGROUND ART

Cooking devices cook by sealing and heating food disposed in a cooking chamber, and examples of the cooking devices may include an oven.

Cooking devices may include a main body which has an open front surface when forming an exterior and into which food to be cooked is inserted, and a door installed on the front surface of the main body to open and close a cooking chamber.

DESCRIPTION OF EMBODIMENTS

Technical Problem

A cooking device according to an embodiment of the disclosure may include a main body, a cooking chamber provided inside the main body, a door provided in a front portion of the main body to open and close the cooking chamber, and a grill heater provided in an upper portion of the cooking chamber to heat the inside of the cooking chamber.

The cooking device may further include a camera module disposed above the grill heater to photograph the inside of the cooking chamber.

The cooking device may further include a first lighting module disposed on a first side of the camera module above the grill heater and configured to radiate light toward the inside of the cooking chamber through a gap of the grill heater, and a second lighting module disposed on a second side of the camera module located opposite to the first side of the camera module above the grill heater and configured to radiate light toward the inside of the cooking chamber through a gap of the grill heater.

The grill heater may include a plurality of straight sections arranged in parallel with each other and a plurality of curved sections connecting the plurality of straight sections to each other.

Portions of at least some of the plurality of straight sections and portions of at least some of the plurality of curved sections may be detour sections bypassing a photographing area of the camera module, a first light irradiation area of the first lighting module, and a second light irradiation area of the second lighting module so that the grill heater does not interfere with the photographing area of the camera module, the first light irradiation area of the first lighting module, and the second light irradiation area of the second lighting module.

A cooking device according to an embodiment of the disclosure may include a main body, a cooking chamber provided inside the main body, a door provided in a front portion of the main body to open and close the cooking chamber, and a grill heater provided in an upper portion of the cooking chamber to heat the inside of the cooking chamber.

The cooking device according to an embodiment of the disclosure may further include a camera module disposed above the grill heater and having a photographable photographing area that widens downwards to photograph the inside of the cooking chamber.

The grill heater may include a pair of first straight sections each extending in a front-back direction and being spaced apart from each other in a horizontal direction perpendicular to the front-back direction, and a pair of first detour sections respectively extending from the pair of first straight sections so as to bypass a photographing area at a height corresponding to the grill heater, each first detour section of the pair of first detour sections including a curved section extending from a first straight section among the pair of first straight sections in a direction angled from the front-back direction in which the pair of first straight sections extend, and a second straight section extending from the curved section in a direction parallel to the front-back direction in which the pair of first straight sections extend.

MODE OF DISCLOSURE

Figure 1:
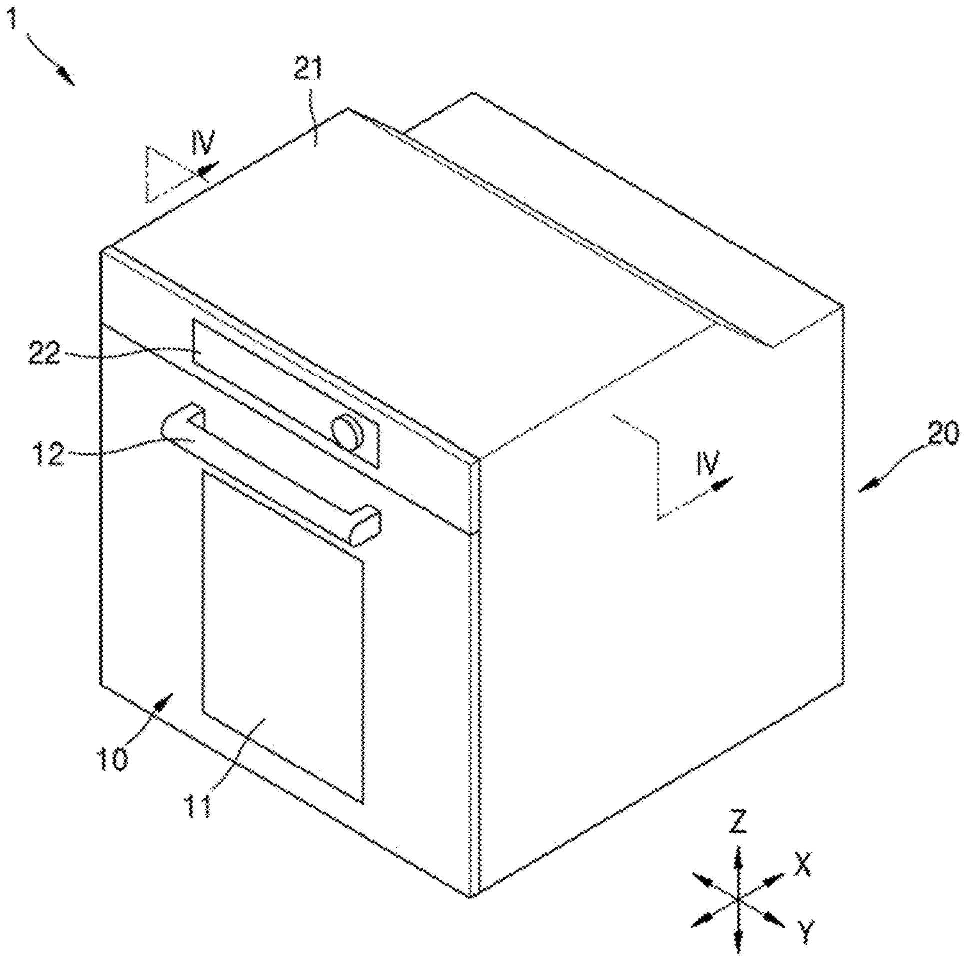
FIG. 1 is a perspective view of a cooking device according to an embodiment of the disclosure.

Throughout the disclosure, the expression "at least one of a, b or c" indicates only a, only b, only c, both a and b, both a and c, both b and c, all of a, b, and c, or variations thereof.

Reference will now be made in detail to embodiments, examples of which are illustrated in the accompanying drawings. Like reference numerals or characters in the drawings denote like parts or components.

While such terms including ordinal numbers such as "first", "second", etc., may be used to describe various components, such components should not be limited to the above terms. The above terms are used only to distinguish one component from another. For example, a first component discussed below could be termed a second component, and similarly, a second component may be termed a first component, without departing from the teachings of this disclosure. The term "and/or" includes any and all combinations of one or more of the associated listed items.

The terms used in the present specification are merely used to describe embodiments, and are not intended to limit the inventive concept. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added. Like reference numerals in the drawings denote like elements performing substantially the same function.

Figure 2:
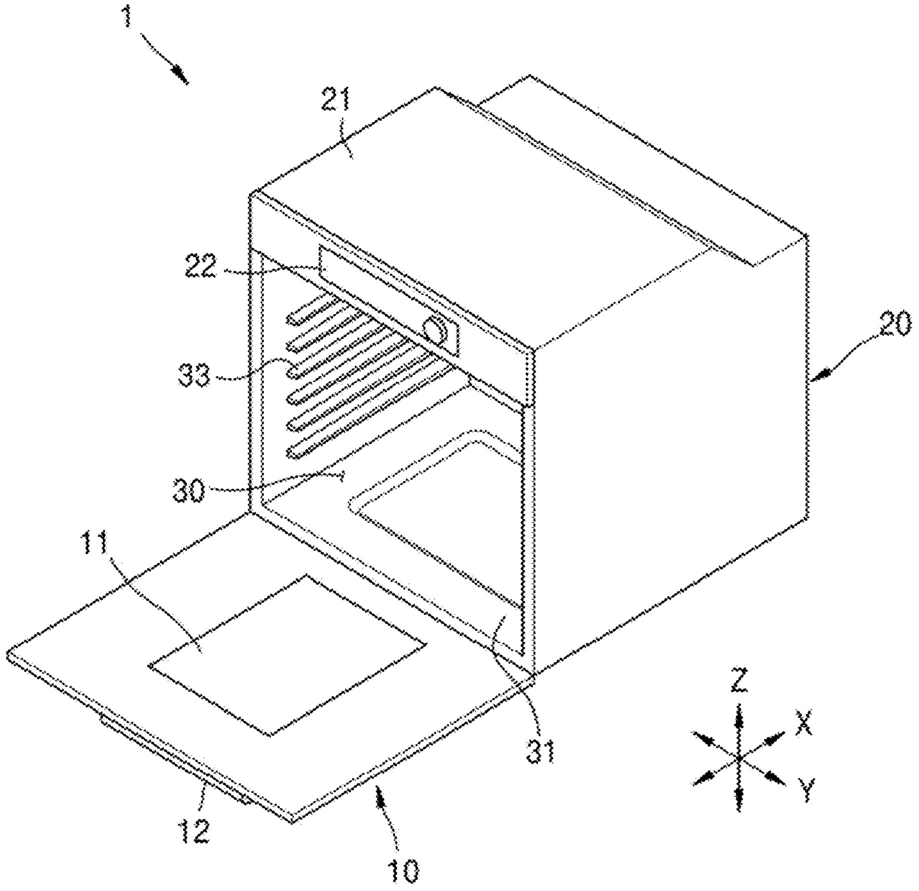
FIG. 2 is a perspective view illustrating a state of the cooking device of FIG. 1 in which a door is opened.
Figure 3:
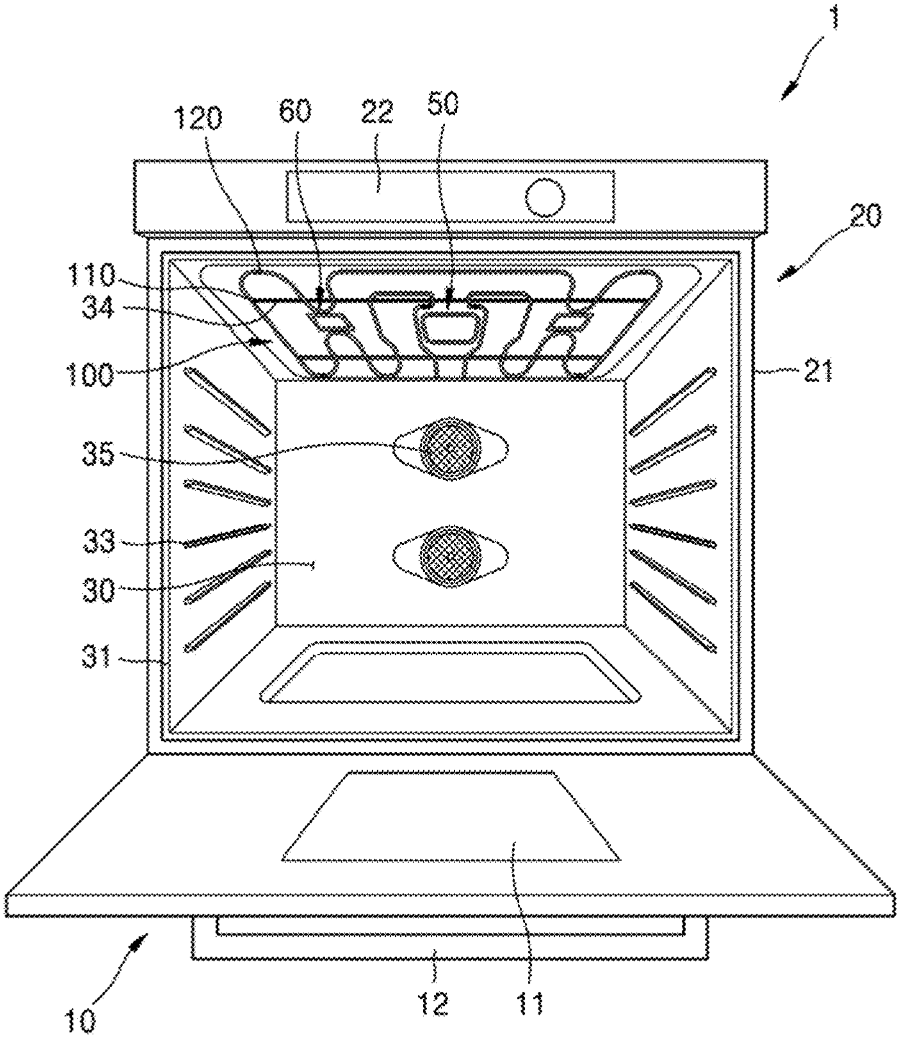
FIG. 3 is a front view of the cook device of FIG. 2.

FIG. 1 is a perspective view of a cooking device 1 according to an embodiment, and FIG. 2 is a perspective view illustrating a state of the cooking device 1 of FIG. 1 in which a door 10 is opened. FIG. 3 is a front view of the cook device 1 of FIG. 2.

Referring to FIGS. 1 through 3, the cooking device 1 according to an embodiment may include a main body 20, and a door 20 provided on a front portion of the main body 20.

A cooking chamber 30 may be provided within the main body 20. The cooking chamber 30 provides a space for cooking food, and may have a box shape with an open front portion.

The door 10 may be provided in the main body 30 to open or close the cooking chamber 30. For example, the door 10 may be installed to be pivotable with respect to a lower side of the front portion of the main body 20. However, the arrangement of the door 10 is not limited thereto, and may vary. For example, the door 10 may be installed to be pivotable with respect to a left or right side of the front portion of the main body 20.

The door 10 may be provided with a window 11. Through the window 11, a user may check the inside of the cooking chamber 30 while the door 10 is being closed. The door 10 may be provided with a handle 12. The user may open or close the door 10 by using the handle 12.

The main body 20 may include an inner case 31 forming the cooking chamber 30, and an outer case 21 surrounding the inner case 31 and forming an exterior of the cooking device 1. A control panel 22 for the user to control an operation of the cooking device 1 may be disposed on an upper portion of the front side of the main body 20.

A tray 32 (see FIG. 4) may be detachably disposed in the inner case 31 so that food may be placed thereon. For example, guide rails 33 may be provided on both sides of the inner case 31 to support the tray 32. A plurality of guide rails 33 spaced apart from one another in a vertical direction Z to arrange a plurality of trays 32 in the vertical direction Z or arrange the trays 32 at various heights may be provided on both lateral surfaces of the inner case 31. For example, five or more guide rails 33 may be provided on the both lateral surfaces of the inner case 31. For example, six to twelve guide rails 33 may be provided on the both lateral surfaces of the inner case 31. For example, six guide rails 33 may be provided on the both lateral surfaces of the inner case 31.

Referring to FIG. 3, a grill heater 100 may be provided in an upper portion of the cooking chamber 30. For example, the grill heater 100 may be fixed to an upper wall of the inner case 31. For example, the grill heater 100 may be fixed to the upper wall of the inner case 31 by a grill support 34.

The grill heater 100 may heat the inside of the cooking chamber 30 from the top. An upper portion of the food disposed inside the cooking chamber 30 may be heated by the grill heater 100, and the food may be entirely heated by a circulation module 35 to be described later.

The grill heater 100 may be an electric heater including an electric resistor. However, the type of grill heater 100 is not limited thereto, and may vary.

The grill heater 100 may include a plurality of straight sections 110, and a plurality of curved sections 120 connecting adjacent straight sections 110 among the plurality of straight sections 110. The grill heater 100 may be a component in which the plurality of straight sections 110 are connected to one another by the curved sections 120. As the grill heater 100 is installed as one component, costs may be lowered, and a surrounding structure for installing the grill heater 100 may be simplified, compared to a plurality of grill heaters 100 separated from each other.

The grill heater 100 may have a diameter of 5 mm or greater. For example, the grill heater 100 may have a diameter of 6 mm or greater. For example, the grill heater 100 may have a diameter of 6 mm to 8 mm.

As the inside of the cooking chamber 30 is heated by the grill heater 100, a temperature of the cooking chamber 30 may rise to a predetermined temperature. For example, the temperature of the cooking chamber 30 may be 250° C. or higher. When the cooking device 1 has a cleaning mode for cleaning the inside of the cooking chamber 30, the temperature of the cooking chamber 30 may further rise. For example, a maximum temperature of the cooking chamber 30 may be 400° C. or higher. For example, the maximum temperature of the cooking chamber 30 may be 400° C. to 600° C.

The main body 20 may include an electrical chamber 40 provided above the cooking chamber 30 to be separated from the cooking chamber 30. For example, the electrical chamber 40 may be provided between the inner case 31 and the outer case 21. Electrical parts (not shown) that control operations of various components may be disposed in the electrical chamber 40.

An insulating material (not shown) may be disposed between the cooking chamber 30 and the electrical chamber 40. Accordingly, leakage of heat inside the cooking chamber 30 to the outside of the cooking device 1 may be reduced, and transfer of heat from the cooking chamber 30 to the electrical chamber 40 may be reduced.

At least one circulation module 35 may be disposed at a rear side of the cooking chamber 30 to circulate air in the cooking chamber 30 so that food is evenly heated. For example, a plurality of circulation modules 35, for example, two circulation modules 35, may be arranged vertically on the rear side of the cooking chamber 30. Each of the circulation modules 35 may include a circulation fan (not shown) generating air flow, and a fan cover disposed in front of the circulation fan.

Figure 4:
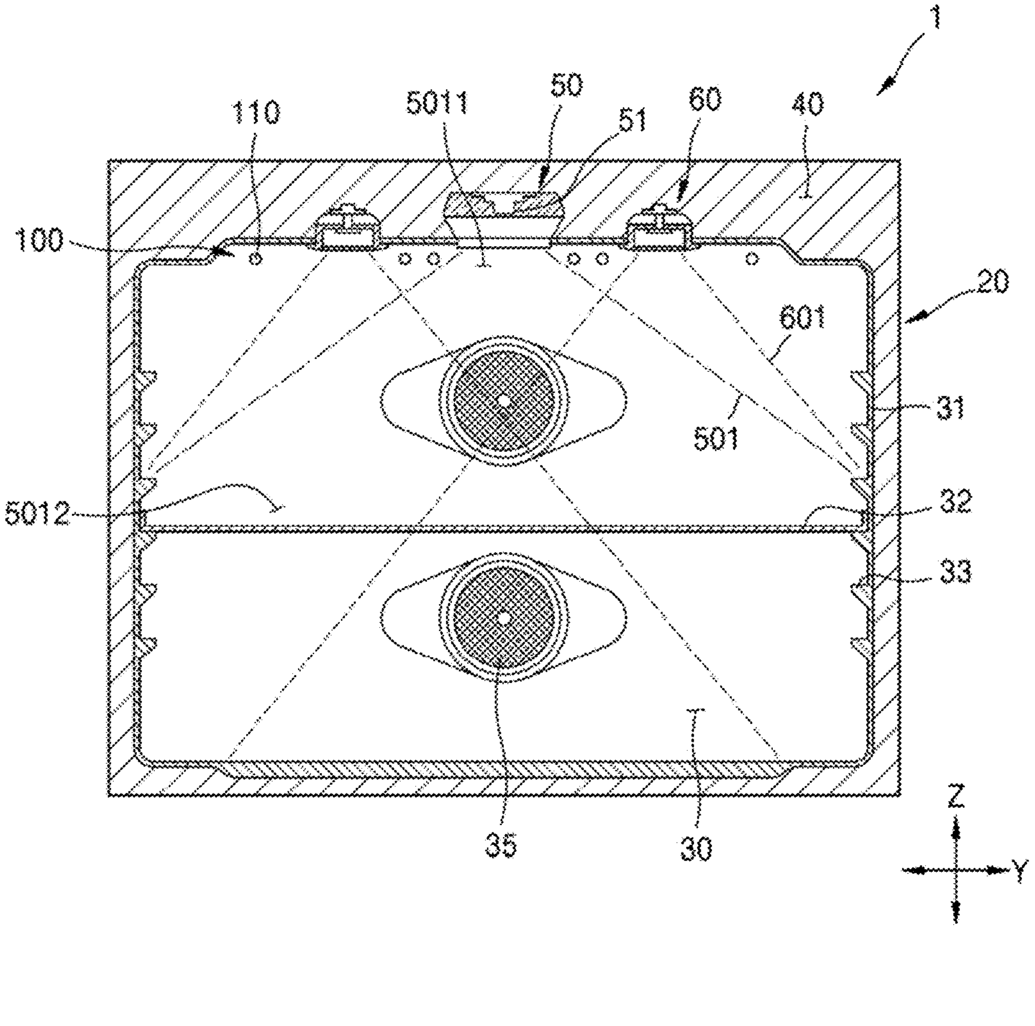
FIG. 4 is a cross-sectional view of the cooking device according to the embodiment of FIG. 1 taken along line IV-IV.

FIG. 4 is a cross-sectional view of the cooking device 1 according to the embodiment of FIG. 1 taken along line IV-IV.

Referring to FIGS. 3 and 4, the cooking device 1 according to an embodiment may include the camera module 50 provided above the grill heater 100, and a lighting module 60 provided above the grill heater 100.

The camera module 50 may be disposed at a center area of the upper portion of the cooking chamber 30. For example, the camera module 50 may be disposed at a center area of the upper portion of the cooking chamber 30 in a front-back direction. For example, the camera module 50 may be disposed close to the door 10 at the center area. For example, the camera module 50 may be disposed at a center line of the upper portion of the cooking chamber 30 in a front-back direction, and may be closer to the door 10 than to the rear side of the cooking chamber 30. The center area in the front-back direction may be a central point located in the middle of the cooking chamber 30 in the front-back direction and a partial area including the center point. Accordingly, the camera module 50 may photograph the food from above the food without distortion. The photography of the food from the top may improve discrimination of the food. For example, the camera module 50 may be disposed between the central point and the door 10 at the center area.

The camera module 50 may be configured to photograph the inside of the cooking chamber 30. The camera module 50 includes a camera 51 that obtains photographing data of the inside of the cooking chamber 30. The photographing data may be at least one of an image or a moving picture.

The cooking device 1 may implement a time-lapse function of identifying food in the cooking chamber 30, monitoring the state of the food, and time-sequentially photographing and reproducing images of the food, based on the photographing data obtained by the camera 51.

At least a portion of the camera module 50 is disposed in the electrical chamber 40 and is disposed to face the cooking chamber 30. For example, the camera 51 of the camera module 50 may be disposed in the electrical chamber 40. Because the camera 51 disposed in the electrical chamber 40 is included to photograph the inside of the cooking chamber 30, an insulating material may not be disposed between the camera 51 (see FIG. 5) and the cooking chamber 30. When the heat of the cooking chamber 30 is transferred to the camera 51, the camera 51 may be damaged, or performance thereof may be deteriorated. When the heat of the cooking chamber 30 is transferred to the electrical chamber 40, components within the electrical chamber 40 may be damaged, or errors may be generated.

Figure 5:
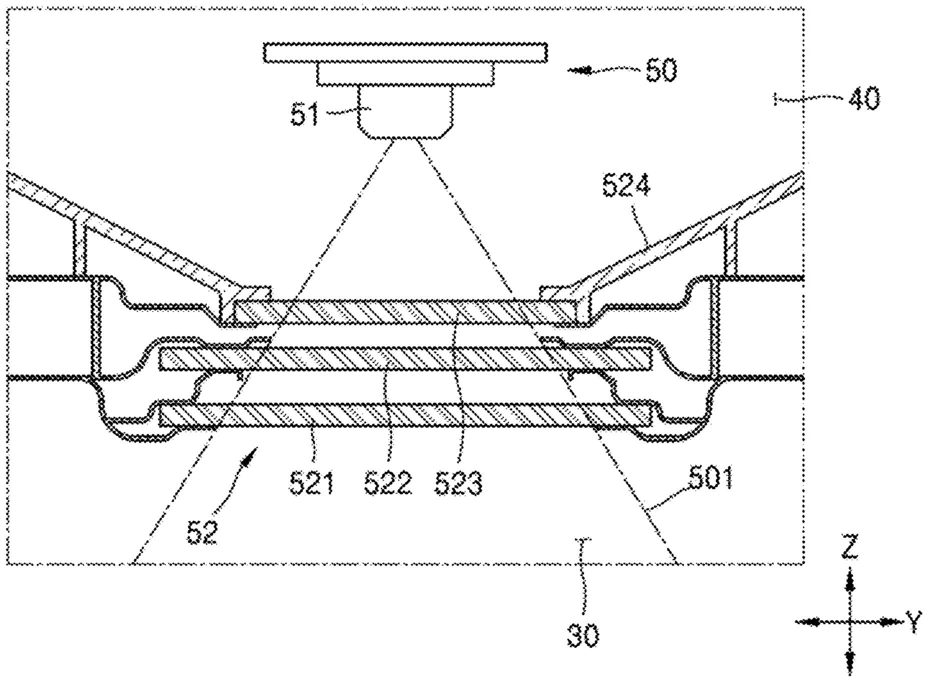
FIG. 5 is a view for explaining an example of a camera module of a cooking device according to an embodiment.

FIG. 5 is a view for explaining the camera module 50 of the cooking device 1 according to an embodiment of the disclosure, and is a magnified view of a cross-sectional structure of the camera module 50 of FIG. 4.

Referring to FIGS. 4 and 5, the camera module 50 of the cooking device 1 according to an embodiment may include the camera 51, and a transparent heat blocking structure 52 disposed between the camera 51 and the cooking chamber 30 to reduce transfer of heat from the cooking chamber 30 to the camera 51.

For example, the transparent heat blocking structure 52 may include a plurality of glasses. The plurality of glasses may include a first glass 521 disposed between the camera 51 and the cooking chamber 30, a second glass 522 disposed between the first glass 521 and the camera 51, and a third glass 523 disposed between the second glass 522 and the camera 51.

The transparent heat blocking structure 52 may be supported by a gap maintaining member 524. The gap maintaining member 524 may support the plurality of glasses and maintain a gap between the plurality of glasses. The gap maintaining member 524 may support the first glass 521, the second glass 522, and the third glass 523, and may maintain a gap between the first glass 521 and the second glass 522 and the second glass 522 and a gap between the second glass 522 and the third glass 523.

The first glass 521 may be provided in the inner case 31 such that a lower surface of the first glass 521 is exposed to the cooking chamber 30. When the inside of the cooking chamber 30 is heated, the lower surface of the first glass 521 may have a temperature corresponding to an internal temperature of the cooking chamber 30. For example, when the internal temperature of the cooking chamber 30 is heated to 450° C., the lower surface of the first glass 521 may rise to 450° C.

Even when the heat of the cooking chamber 30 is transferred to the lower surface of the first glass 521, the amount of heat transferred to the camera 51 may be reduced by the first glass 521, the second glass 522, the third glass 523, and air layers between the first, second, and third glasses 521, 522, and 523. The transparent heat blocking structure 52 may prevent the camera 51 from being overheated due to the heat of the cooking chamber 30. For example, the temperature of the camera 51 may be maintained at 20% or less of the temperature of the cooking chamber 30 so that the camera 51 does not overheat. For example, the temperature of the camera 51 may be maintained at a predetermined temperature, for example, 100° C. or less. For example, when the temperature of the cooking chamber 30 is 450° C., the temperature of the camera 51 disposed in the electrical chamber 40 may be 77.5° C.

A thickness of the transparent heat blocking structure 52 may be reduced through a triple glass structure, and, accordingly, the camera module 50 may photograph a determined photographing area 501. For example, a sum of the gaps between the glasses of the transparent heat blocking structure 52 may be 10 mm or less due to a triple glass structure. For example, a sum of the gap between the first glass 521 and the second glass 522 and the gap between the second glass 522 and the third glass 523 may be 10 mm or less. Accordingly, the camera module 50 may entirely photograph an area corresponding to at least a middle height of the cooking chamber 30.

The camera module 50 may photograph the inside of the cooking chamber 30 through the plurality of glasses of the transparent heat blocking structure 52. The gap maintaining member 524 may be disposed to surround a rim of the first glass 521. An area of the first glass 521 that is not surrounded by the gap maintaining member 524 may be an exposed area that is exposed to the cooking chamber 30.

The photographing area 501 of the camera module 50 may be an area photographed by the camera 51 through the plurality of glasses. In other words, the photographing area 501 may be an area where the camera 51 is able to photograph through the exposed area. The photographing area 501 may widen downwards to photograph the inside of the cooking chamber 30. The photographing area 501 may have a greater photographable area or width downwards. For example, the photographing area 501 of the camera module 50 may cover a plane size of the cooking chamber 30 at the middle height.

Referring back to FIG. 4, the lighting module 60 may radiate light toward the inside of the cooking chamber 30. The food may be visually confirmed through the light radiated into the cooking chamber 30 by the lighting module 60. For example, identification, monitoring, and a time lapse of the food may be possible based on the photographing data obtained by the camera module 50. In addition, the user may visually check the state of the food through the window 11 of the door 10.

The inside of the cooking chamber 30 may have a predetermined brightness due to the lighting module 60. For example, an average illuminance at the middle height of the cooking chamber 30 may be 300 lux or more by the lighting module 60. For example, the average illuminance inside the cooking chamber 30 by the lighting module 60 may be 400 lux or more based on a tray 32 at a third height among six-tiered trays 32.

Figure 6:
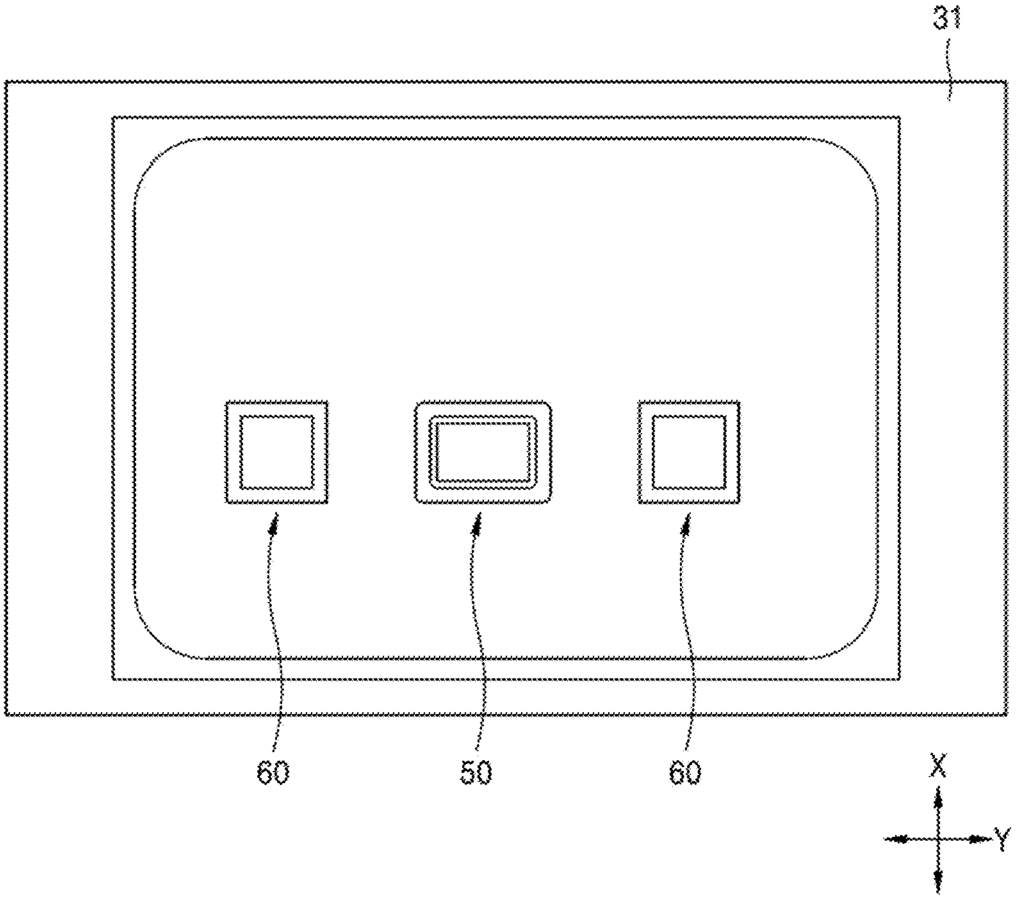
FIG. 6 is a view for explaining an example of the layout of a camera module and a lighting module in a cooking device according to an embodiment.
Figure 7:
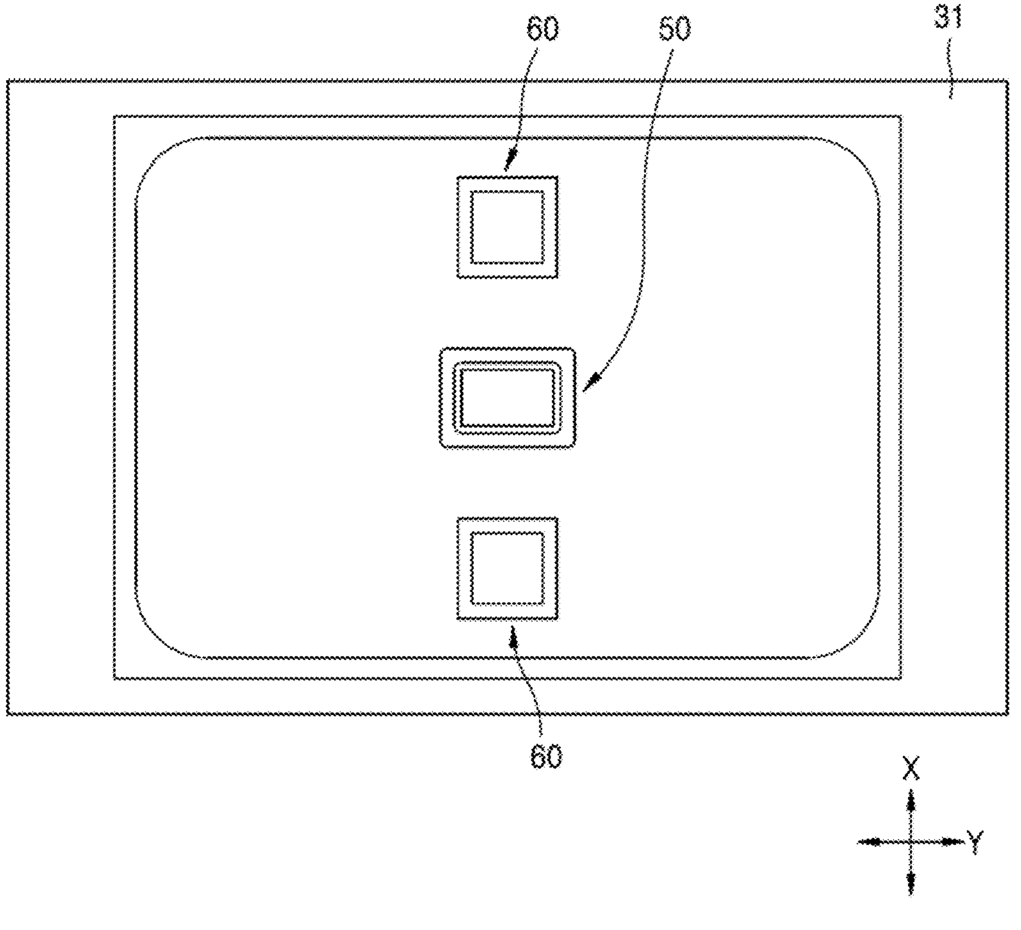
FIG. 7 is a view for explaining another example of the layout of a camera module and a lighting module in a cooking device according to an embodiment.

FIG. 6 is a view for explaining an example of the layout of the camera module 50 and the lighting module 60 in the cooking device 1 according to an embodiment. FIG. 7 is a view for explaining another example of the layout of the camera module 50 and the lighting module 60 in the cooking device 1 according to an embodiment. In FIGS. 6 and 7, illustration of the grill heater 100 is omitted for convenience of explanation.

Referring to FIGS. 4 and 6, the lighting module 60 may be provided in plurality. For example, the lighting module 60 may be provided in pair. A pair of lighting modules 60 may be disposed on both sides of the camera module 50, respectively.

The pair of lighting modules 60 may include first and second lighting modules disposed apart from each other. The first lighting module may be disposed on a first side of the camera module 50, and the second lighting module may be disposed on a second side of the camera module 50 that is opposite to the first side of the camera module 50.

The pair of lighting modules 60 and the camera module 50 may be arranged side by side. In other words, the pair of lighting modules 60 and the camera module 50 may be disposed in alignment with each other.

For example, the pair of lighting modules 60 may be disposed on both sides of the camera module 50 in a horizontal direction Y. However, the arrangement of the pair of lighting modules 60 is not limited thereto, and the pair of lighting modules 60 may be arranged in various ways as long as they are symmetrically disposed on both sides with the camera module 50 interposed therebetween. For example, as shown in FIG. 7, the pair of lighting modules 60 may be disposed on both sides of the camera module 50 in a front-back direction X. For example, the pair of lighting modules 60 may be disposed diagonally with the camera module 50 interposed therebetween.

As the pair of lighting modules 60 are disposed on both sides with the camera module 50 interposed therebetween, light may be directly radiated to most areas of the cooking chamber 30, and a difference in illuminance inside the cooking chamber 30 may be reduced. For example, a light irradiation area 601 directly irradiated with light by each of the lighting modules 60 may be secured a predetermined size or more within the cooking chamber 30. For example, the light irradiation area 601 of each of the lighting modules 60 may cover at least half the plane size of the cooking chamber 30 at the middle height.

Figure 8:
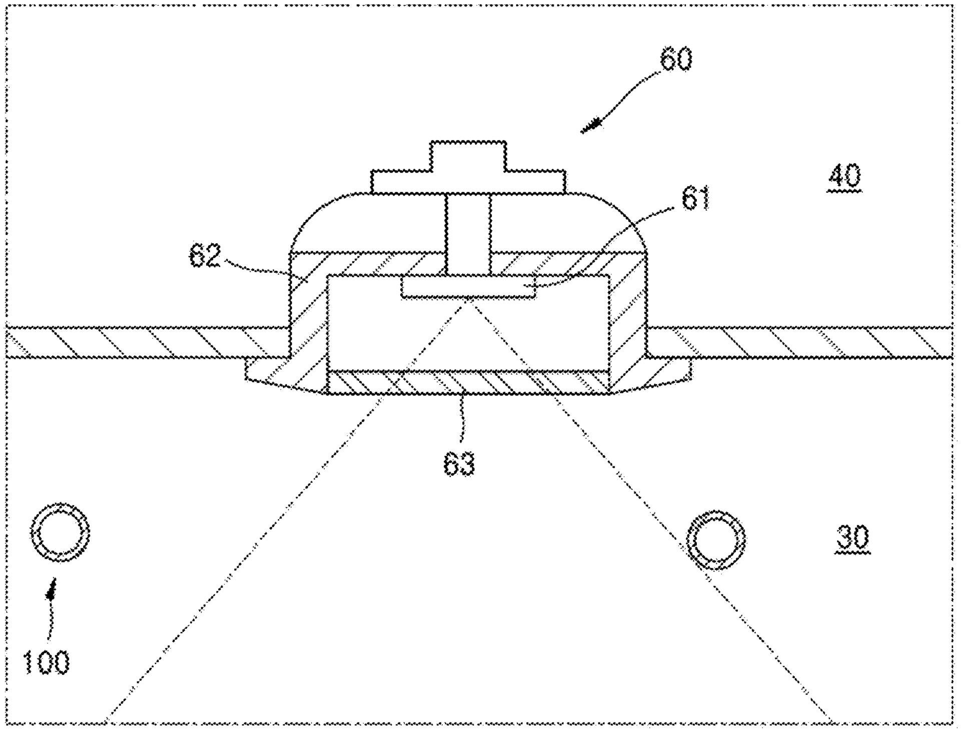
FIG. 8 is a view for explaining an example of a lighting module of a cooking device according to an embodiment.

FIG. 8 is a view for explaining an example of a camera module 60 of the cooking device 1 according to an embodiment.

Referring to FIGS. 4 and 8, each of the lighting modules 60 may have at least one light source 61. For example, each of the lighting modules 60 may include a plurality of light sources 61. The plurality of light sources 61 may be arranged in the front-back direction X. Each of the plurality of light sources 61 may include a light-emitting element. For example, the light-emitting element may be a light-emitting diode. However, the configuration of the lighting module 60 is not limited thereto, and may be freely selected as long as it is able to generate enough light to visually confirm the food.

Each of the lighting modules 60 may include a light guide plate 62 for reflecting the light generated by the light source 61 toward the cooking chamber 30, and a protective glass 63 disposed between the light source 61 and the cooking chamber 30. The light guide plate 62 may be disposed to surround the light source 61. The protective glass 63 may transmit light and block the heat of the cooking chamber 30. The protective glass 63 may perform a function of spreading the light while transmitting the light generated by the light source 61 and the light reflected by the light guide plate 62.

The light irradiation area 601 of the lighting module 60 may widen downwards to radiate light toward the inside of the cooking chamber 30. A radiation angle of light emitted by the lighting module 60 may be 80° to 90° with respect to the light source 61. For example, the radiation angle of the light emitted by the lighting module 60 may be 80° to 90° with respect to the light source 61 in the horizontal direction Y.

Referring back to FIG. 4, the camera module 50 and the pair of lighting modules 60 may be disposed above the grill heater 100. In other words, the camera module 50 may be disposed above the grill heater 100, and the pair of lighting modules 60 may be disposed above the grill heater 100. In other words, the grill heater 100 may be disposed below the camera module 50 and the pair of lighting modules 60.

The camera module 50 disposed in the upper portion of the grill heater 100 may have a photographable photographing area 501 that widens downwards to photograph the inside of the cooking chamber 30. The photographing area 501 may include a first photographing area 5011 formed at a height corresponding to the grill heater 100, and a second photographing area 5012 formed at a mid-height of the cooking chamber 30 and wider than the first photographing area 5011. The second photographing area 5012 may cover a planar size of the cooking chamber 30 at the middle height.

The pair of lighting modules 60 may be disposed on both sides of the camera module 50, respectively, and the light irradiation area 601 of each of the pair of lighting modules 60 may widen downwards to radiate light toward the inside of the cooking chamber 30.

As such, the cooking device 1 in which the camera module 50 and the lighting module 60 are disposed along with the grill heater 100 above the cooking chamber 30 may be large in size. For example, one side of the cooking device 1 may be 500 mm or greater. One side of the cooking device 1 may be 600 mm to 1000 mm. For example, a size of the cooking chamber 30 may be large. For example, a capacity of the cooking chamber 30 of the cooking device 1 may be equal to or greater than a predetermined size. For example, the capacity of the cooking chamber 30 may be 80 liter or more. For example, the capacity of the cooking chamber 30 may be 100 liter or more. For example, the capacity of the cooking chamber 30 may be 80 liter to 300 liter. For example, the capacity of the cooking chamber 30 may be 100 liter to 250 liter.

As such, when the size of the cooking device 1 or the cooking chamber 30 is large, a structure of the grill heater 100 for heating the inside of the cooking chamber 30 may be changed. For example, a shape of the grill heater 100 may be changed.

Figure 9:
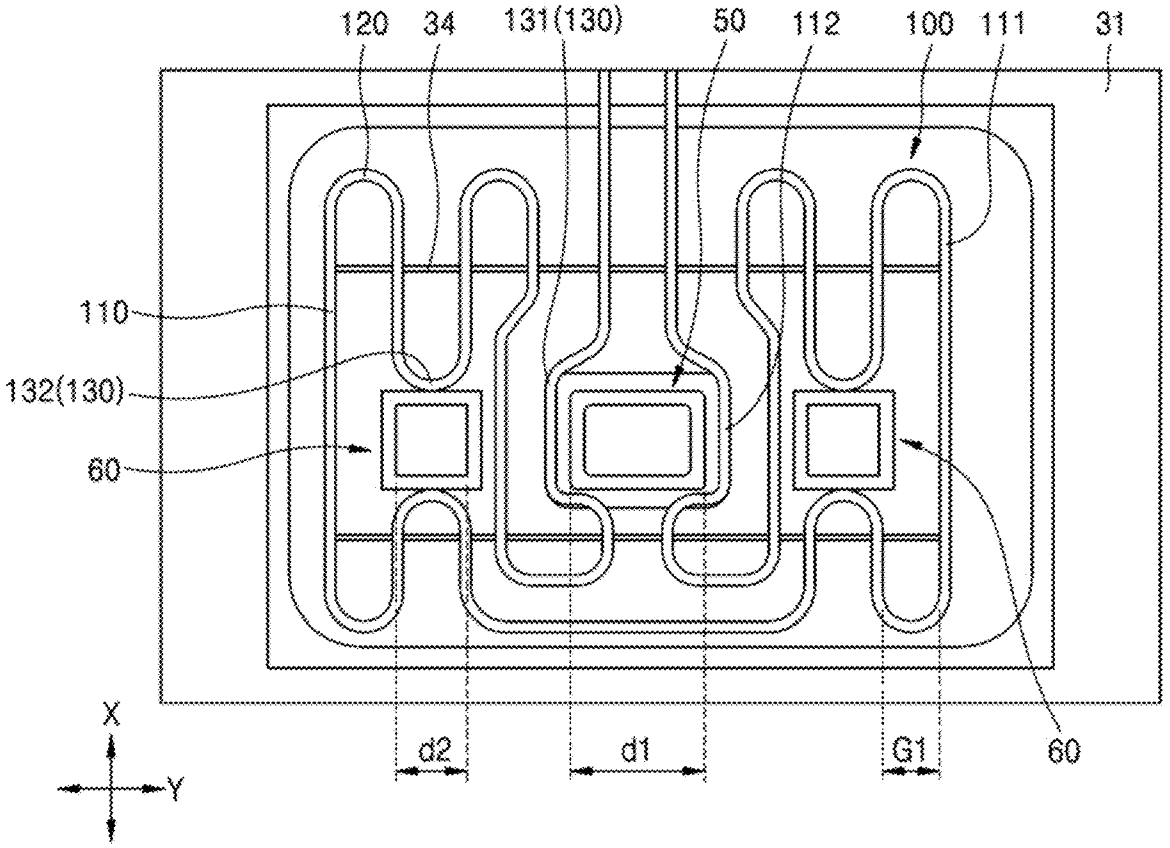
FIG. 9 is a view for explaining a layout of a camera module, a lighting module, and a grill heater in a cooking device according to an embodiment.
Figure 10:
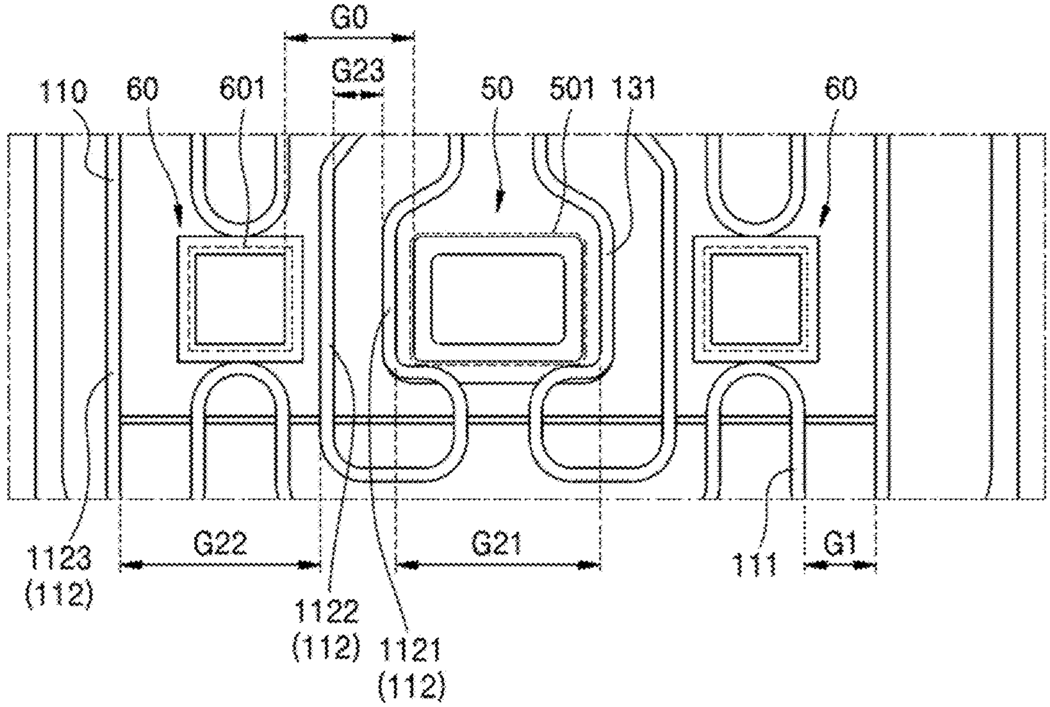
FIG. 10 is a magnified view of a portion of FIG. 9.

FIG. 9 is a view for explaining a layout of the camera module 50, the lighting module 60, and the grill heater 100 in the cooking device 1 according to an embodiment. FIG. 10 is a magnified view of a portion of FIG. 9.

Referring to FIG. 9, a gap in the grill heater 100 according to an embodiment may be narrow in order to heat the inside of the cooking chamber 30. For example, gaps between the plurality of straight sections 110 in the grill heater 100 may be reduced. The gaps between the straight sections 110 may be gaps in a direction perpendicular to an extension direction of each of the straight sections 110, for example, in the horizontal direction Y.

For example, an average of the gaps between the plurality of straight sections 110 of the grill heater 100 may be reduced. In other words, an average gap between the straight sections 110 of the grill heater 100 may be reduced.

For example, the plurality of straight sections 110 may include first straight sections 111 spaced apart from each other by a first gap G1, and second straight sections 112 disposed adjacent to the camera module 50 or the lighting module 60 and arranged by second gaps G21, G22, and G23 different from the first gap G1. The first gap G1 between the plurality of straight sections 110 in the grill heater 100 according to an embodiment may be small. The first gap G1 between the plurality of first straight sections 111 may be a gap between most, for example, half or more, of the straight sections 110 in the grill heater 100 according to an embodiment.

For example, the first gap G1 between the first straight sections 111 of the grill heater 100 may be less than a length of one side of the camera module 50. In other words, the length of one side of the camera module 50 may be greater than the first gap G1 of the grill heater 100. For example, the first gap G1 of the grill heater 100 may be less than a length of a longer side d1 of the camera module 50. The first gap G1 of the grill heater 100 may be less than a length of a shorter side of the camera module 50.

For example, the first gap G1 of the grill heater 100 may be less than a length of one side of the lighting module 60. In other words, the length of one side of the lighting module 60 may be greater than the first gap G1 of the grill heater 100. For example, the first gap G1 of the grill heater 100 may be less than a length of a longer side of the lighting module 60. For example, the first gap G1 of the grill heater 100 may be less than a length of a shorter side d2 of the lighting module 60. For example, the first gap G1 of the grill heater 100 may be 50 mm or less. For example, the first gap G1 of the grill heater 100 may be 45 mm or less.

When the first gap G1 of the grill heater 100 is small as described above, a portion of the grill heater 100 may be disposed close to the camera module 50 and the lighting module 60 disposed above the grill heater 100.

Considering this point, in the cooking device 1 according to an embodiment, the shape of the grill heater 100 may be designed such that the grill heater 100 does not cover the photographing area 501 of the camera module 50 or the light irradiation area 601 of the lighting module 60. In other words, the shape of the grill heater 100 may be designed such that the grill heater 100 does not interfere with the photographing area 501 of the camera module 50 or the light irradiation area 601 of the lighting module 60.

For example, the grill heater 100 may be configured such that light may be radiated into the cooking chamber 30 through a gap of the grill heater 100 by a pair of lighting modules 60 and the inside of the cooking chamber 30 through a gap of the grill heater 100 may be photographed by the camera module 50.

Referring to FIG. 10, for example, the grill heater 100 may include detour sections 130 bypassing the photographing area 501 of the camera module 50 and the light irradiation area 601 of the lighting module 60 not to interfere with the photographing area 501 of the camera module 50 and the light irradiation area 601 of the lighting module 60.

The detour sections 130 may be portions of the plurality of straight sections 110 and the plurality of curved sections 120. The detour sections 130 may be portions of at least some of the plurality of straight sections 110 and portions of at least some of the plurality of curved sections 120.

The detour sections 130 may include a first detour section 131 bypassing the photographing area 501 of the camera module 50 and a second detour section 132 bypassing the light irradiation area 601 of the lighting module 60. The second detour section 132 may bypass the light irradiation area 601 of the first lighting module or the light irradiation area 601 of the second lighting module.

The first detour section 131 may have a shape that does not overlap the camera module 50 in a vertical direction, and a second bypass section 132 may have a shape that does not overlap the protective glass 63 of the lighting module 60.

For example, the first detour section 131 may extend from a rear side of the camera module 50 to a front side thereof by bypassing a left or right side of the camera module 50. For example, the first detour section 131 may extend from a rear side of the first glass 521 to a front side thereof by bypassing the left or right side of the camera module 50. For example, the second detour section 132 may change a direction without extending from a rear side of the lighting module 60 to a front side thereof, or may change a direction without extending from the front side of the lighting module 60 to the rear side thereof. However, the shape of the detour section 130 is exemplary, and may be variously modified within a range of bypassing the camera module 50 and the lighting module 60.

As the grill heater 100 includes the detour sections 130, a gap between the second straight sections 112 adjacent to the camera module 50 or the lighting module 60 in the straight section 110 may be increased or decreased. Being adjacent to the camera module 50 or the lighting module 60 refers to being closest to the camera module 50 or the lighting module 60 in a direction perpendicular to the extension direction of the straight section 110, for example, in the horizontal direction Y. The gaps between the second straight sections 112 of the grill heater 100 may include the second gaps G21, G22, and G23 different from the first gap G1. For example, the second gap G21 between a second straight section 1121 bypassing the left side of the photographing area 501 of the camera module 50 and a second straight section 1121 bypassing the right side of the photographing area 501 of the camera module 50 may be greater than the first gap G1 of the grill heater 100. For example, the second gap G22 between second straight sections 1122 and 1123 adjacent to the light irradiation area 601 of the lighting module 60 in the horizontal direction Y may be greater than the first gap G1 of the grill heater 100. For example, the second gap G23 between the second straight sections 1121 and 1122 arranged between the camera module 50 and the lighting module 60 may be less than the first gap G1 of the grill heater 100. In other words, the second gap G23 between the second straight sections 1121 adjacent to the camera module 50 and the second straight sections 1122 adjacent to the lighting module 60 may be less than the first gap G1 of the grill heater 100. For example, the second gap G23 between the second straight sections 1121 and 1122 arranged between to the camera module 50 and the lighting module 60 may be less than a gap G0 between the camera module 50 and the lighting module 60.

Figure 11:
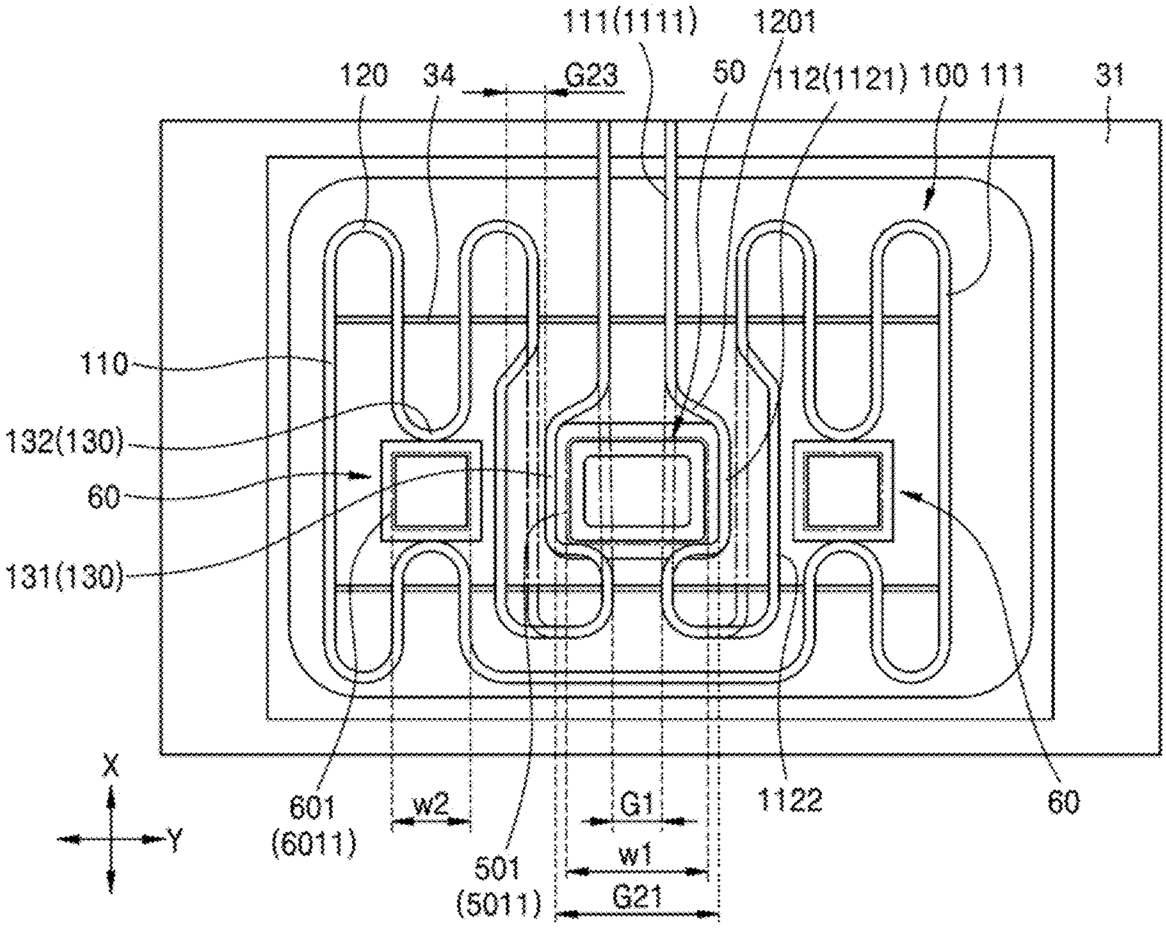
FIG. 11 is a view for explaining a shape of a grill heater of FIG. 9.

FIG. 11 is a view for explaining a shape of the grill heater 100 of FIG. 9.

Referring to FIG. 11, the grill heater 100 according to an embodiment of the disclosure includes a pair of first straight sections 1111 each extending in the front-back direction X, and a pair of first detour sections 131 respectively extending from the pair of first straight sections 1111.

The pair of first straight sections 1111 may each extend toward the first photographing area 5011 of the camera module 50. For example, the pair of first straight sections 1111 may each extend forwards from the rear side of the cooking chamber 30. One end of each of the pair of first straight sections 1111 may be connected to the rear side of the cooking chamber 30, and the other end thereof may be connected to its corresponding first detour section 131.

A first gap G1 in the horizontal direction Y between the pair of first straight sections 1111 may be less than a width w1 of the first photographing area 5011 in the horizontal direction Y.

The pair of first detour sections 131 may each have a shape that bypasses the first photographing area 5011, which is the photographing area 501 at a height corresponding to the grill heater 100. For example, a second gap G21 in the horizontal direction Y between the pair of first detour sections 131 may be greater than the width w1 of the first photographing area 5011 in the horizontal direction Y. For example, at least a portion of the second gap G21 in the horizontal direction Y between the pair of first detour sections 131 may vary according to locations in the front-back direction X. A maximum gap among the second gaps G21 may be greater than the width w1 of the first photographing area 5011 in the horizontal directions Y.

Each of the pair of first detour sections 131 may include a curved section 1201 extending from the first straight section 1111 in a direction inclined from the direction in which the first straight section 1111 extends, and a 2-1 straight section 1121 (of second straight sections 112) extending from the curved section 1201 in a direction parallel to the direction in which the first straight section 1111 extends. The direction in which the first straight section 1111 extends may be the front-back direction X. The pair of first detour sections 131 may include a 2-1 straight section 1121 and a pair of curved sections 1201. The pair of 2-1 straight sections 1121 may each extend in the front-back direction X, and may be spaced apart from each other in the horizontal direction Y by a gap greater than the width w1 of the first photographing area 5011 in the horizontal direction Y. A gap in the horizontal direction Y between the pair of 2-1 straight sections 1121 may be greater than the width w1 of the first photographing area 5011 in the horizontal direction Y. Each of the pair of curved sections 1201 may connect between the 2-1 straight section 1121 and the first straight section 1111. A maximum gap among the second gaps G21 may be a gap in the horizontal directions Y between the 2-1 straight sections 1121.

The grill heater 100 may include a 2-2 straight section 1122 (which may be referred to at times as a third straight section herein) extending in the front-back direction X and disposed between the 2-1 straight section 1121 and the lighting module 60. A gap G23 in the horizontal direction Y between the 2-1 straight section 1121 and the 2-2 straight section 1122 may be less than the first gap G1 in the horizontal direction Y between the pair of first straight sections 1111.

When the grill heater 100 does not bypass the photographing area 501 of the camera module 50, the grill heater 100 may include a plurality of first straight sections 111 overlapping the photographing area 501 in a vertical direction, as indicated by a one-dot-dashed line, and arranged at regular intervals of the first gap G1. On the other hand, the grill heater 100 according to an embodiment of the disclosure includes a first detour section 131 that bypasses the photographing area 501 of the camera module 50, and thus the gap G23 between 2-1 straight sections 1121 may be less than the first gap G1 between first straight sections 111.

The grill heater 100 may further include a pair of second detour sections 132, at least a portion of each of which extends in a direction different from the front-back direction X to bypass the light irradiation area 6011 at a height corresponding to the grill heater 100. The second detour section 132 may include a curved area 120 connecting the plurality of first straight sections 111 each extending in the front-back direction X toward the light irradiation area 601.

However, the shape of the grill heater 100 is exemplary and is not necessarily limited thereto, and may be variously modified within a range including the detour sections 130 bypassing the camera module 50 and the lighting module 60 so as not to overlap the camera module 50 and the lighting module 60 in the vertical direction Z.

When the grill heater 100 includes no detour sections 130 and a portion of the grill heater 100 covers the photographing area 501 of the camera module 50 or the light irradiation area 601 of the lighting module 60, a recognition rate of the cooking device 1 with respect to the food may decrease. For example, when the portion of the grill heater 100 covers the photographing area 501, a portion of the food may be covered, and accordingly, the food recognition rate may decrease. For example, when the portion of the grill heater 100 covers the light irradiation area 601, a shadow caused by the grill heater 100 is formed on the food, and accordingly, the food recognition rate may decrease.

In contrast, as the grill heater 100 according to an embodiment has a structure that does not cover the photographing area 501 and the light irradiation area 601, the food recognition rate of the cooking device 1 may be improved.

Figure 12:
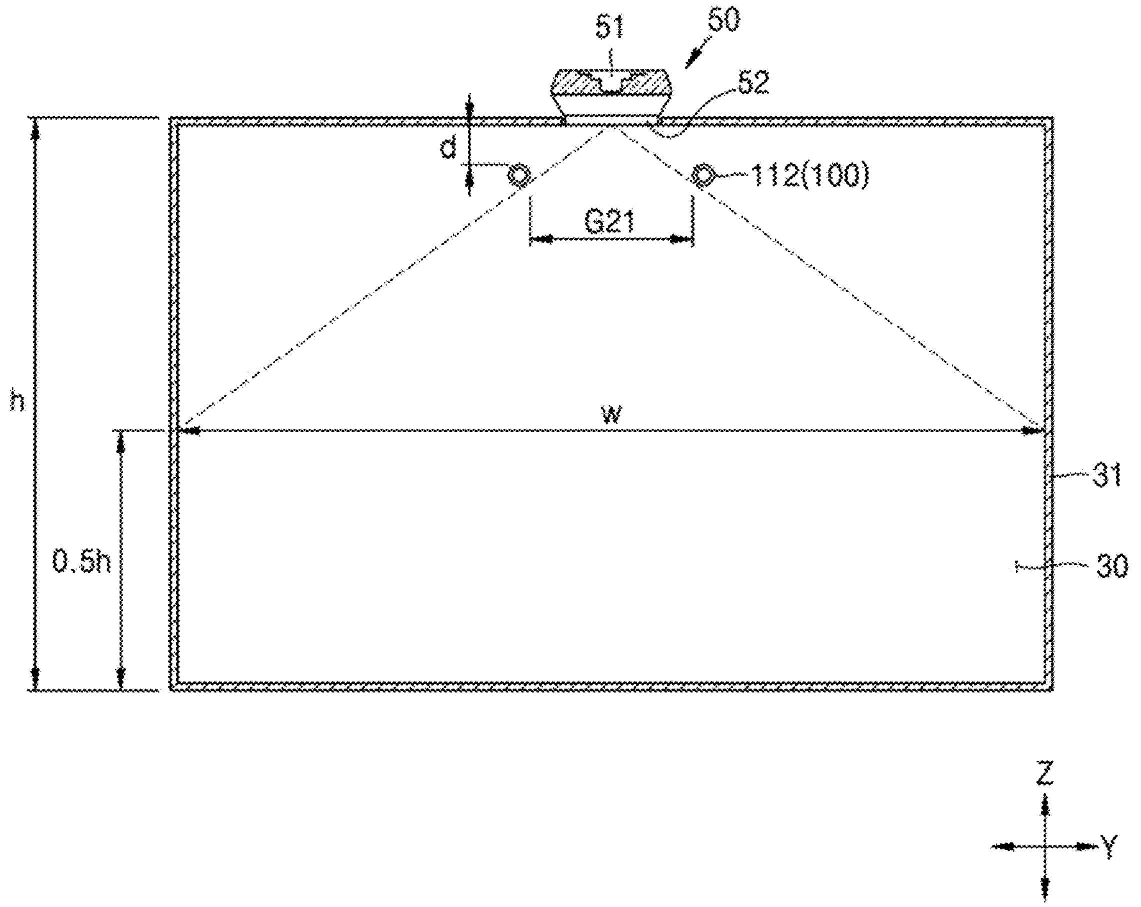
FIG. 12 is a view for explaining a layout of a camera module and a grill heater in a cooking device according to an embodiment of the disclosure.

FIG. 12 is a view for explaining the layout of the camera module 50 and the lighting module 60 in the cooking device 1 according to an embodiment of the disclosure.

Referring to FIG. 12, the camera module 50 is disposed above the grill heater 100. In order for the camera module 50 to photograph the inside of the cooking chamber 30 through the second gaps G21, G22, and G23 of the grill heater 100, the second gaps G21, G22, and G23 of the grill heater 100 may be determined in consideration of, for example, a vertical distance between the camera module 50 and the grill heater 100, a width of the cooking chamber 30, and a distance between the camera module 50 and a bottom wall of the cooking chamber 30.

For example, the camera module 50 may cover the plane size of the cooking chamber 30 at the middle height. The second gap G21 of the grill heater 100 may be designed so that the grill heater 100 does not interfere with the photographing area 501 of the camera module 50.

For example, the second gap G21 between the second straight sections 112 adjacent to the camera module 50 in the grill heater 100 may be determined in consideration of the vertical distance between the camera module 50 and the grill heater 100, the width of the cooking chamber 30, and a height of the cooking chamber 30. The height of the cooking chamber 30 may correspond to the distance between the camera module 50 and a bottom surface of the cooking chamber 30.

For example, given that a width, in the horizontal direction Y, of the grill heater 100 adjacent to the camera module 50 is G21, the vertical distance between the camera module 50 and the grill heater 100 is d, and a width of the cooking chamber 30 in the horizontal direction Y is w, and the distance between the camera module 50 and the bottom surface of the cooking chamber 30 is h, the second gap G21 of the grill heater 100 may be 2*d/h of w (G21≥2*d/h*w).

Figure 13:
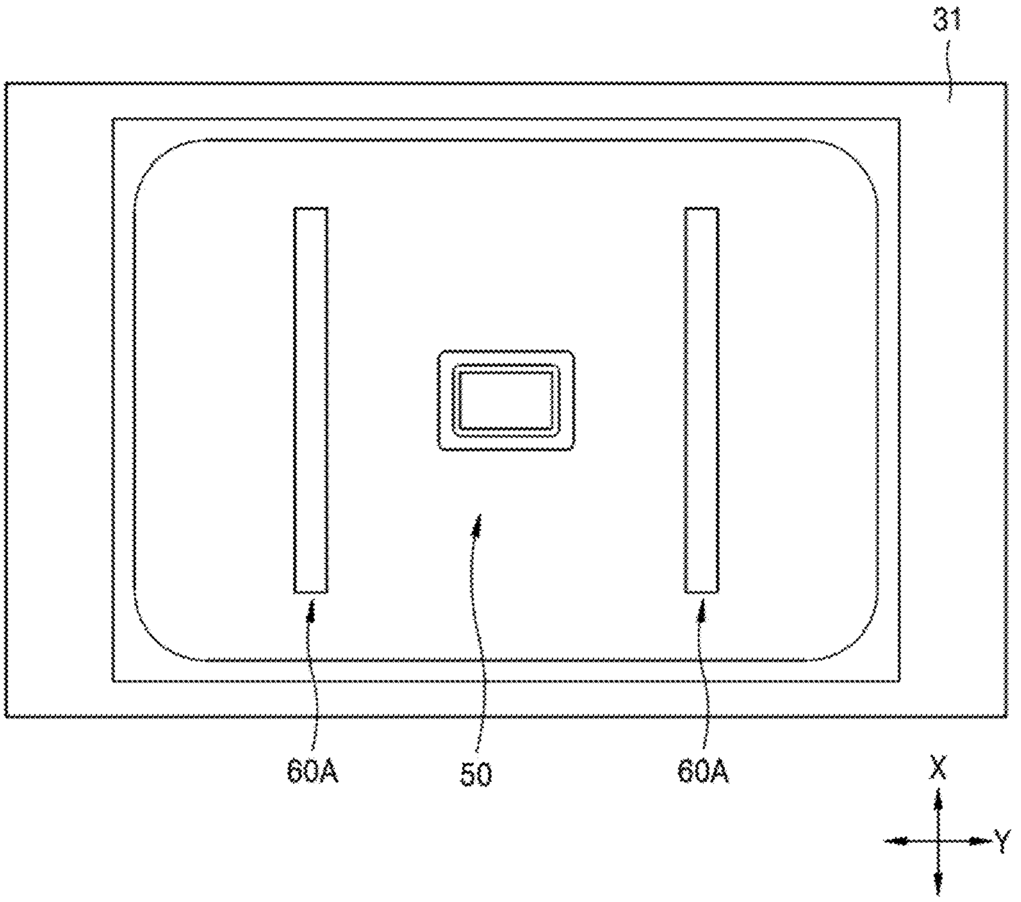
FIG. 13 is a view for explaining an example of a lighting module of a cooking device according to an embodiment of the disclosure.

According to the above-described embodiment, a shape in which a length of the lighting module 60 in the front-back direction X corresponds to a length of the camera module 50 in the front-back direction X. However, the shape of the lighting module 60 is limited thereto. For example, as shown in FIG. 13, a length of a lighting module 60A in the front-back direction X may be greater than that of the camera module 50 in the front-back direction X. For example, the lighting module 60A may have a structure that is long in the front-back direction X, and may be disposed on both sides of the camera module 50 in the horizontal direction Y.

Figure 14:
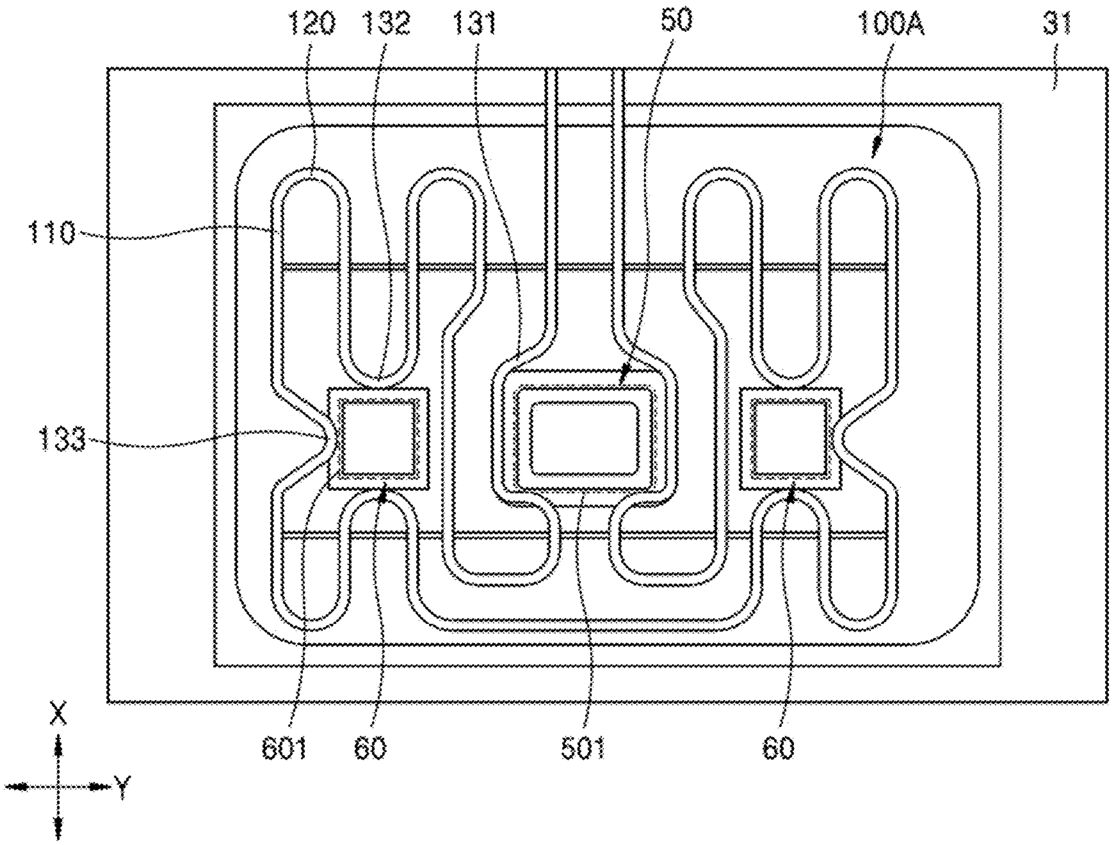
FIG. 14 is a view for explaining a shape of a grill heater in a cooking device according to an embodiment of the disclosure.

The shape of the grill heater 100 may vary within a range that does not interfere with the lighting module 60 and the camera module 50. For example, as shown in FIG. 14, a grill heater 100A may be bent such that a partial section 133 is adjacent to the left or right side of the lighting module 60 within a range that does not cover the light irradiation area 601 of the lighting module 60.

For understanding of the disclosure, reference numerals have been written in embodiments shown in the drawings and specific terms have been used to describe the embodiments, but the disclosure is not limited by the specific terms and the disclosure may include all components commonly conceivable by one of ordinary skill in the art.

Specific executions described in the disclosure are embodiments, and do not limit the scope of the disclosure in any way. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential for application of the disclosure unless the item or component is specifically described as "essential" or "critical". Expressions such as "comprising" and "including" used herein are used to be understood as terms of an open end of technology.

The use of the terms "a" and "an" and "the" and similar referents in the context of describing the disclosure (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. The operations that constitute a method described herein can be performed in any suitable order unless otherwise indicated herein or otherwise clearly contradicted by context. The disclosure is not limited to the described order of the operations. The use of any and all examples, or exemplary language (e.g., "such as") provided herein, is intended merely to better illuminate the disclosure and does not pose a limitation on the scope of the disclosure unless otherwise claimed. Numerous modifications and adaptations will be readily apparent to one of ordinary skill in the art without departing from the spirit and scope of the disclosure.

A cooking device according to an embodiment of the disclosure provides a structure capable of improving the quality of a captured image of food in a cooking chamber.

The cooking device according to an embodiment of the disclosure may include a main body, a cooking chamber inside the main body, a door provided in a front portion of the main body to open and close the cooking chamber, a grill heater provided in an upper portion of the cooking chamber to heat the inside of the cooking chamber, and a camera module disposed above the grill heater and having a photographable photographing area that widens downwards to photograph the inside of the cooking chamber.

The grill heater may include a pair of first straight sections each extending in a front-back direction and being spaced apart from each other in a horizontal direction perpendicular to the front-back direction, and a pair of first detour sections respectively extending from the pair of first straight sections so as to bypass a photographing area at a height corresponding to the grill heater, each first detour section of the pair of first detour sections including a curved section extending from a first straight section among the pair of first straight sections in a direction angled from the front-back direction in which the pair of first straight sections extend, and a second straight section extending from the curved section in a direction parallel to the front-back direction in which the pair of first straight sections extend.

The photographing area may include a first photographing area formed at a height corresponding to the grill heater, and a second photographing area formed at a mid-height of the cooking chamber and wider than the first photographing area, and a first gap in the horizontal direction between the pair of first straight sections may be less than a width of the first photographing area in the horizontal direction.

A second gap in the horizontal direction between the pair of first detour sections may be greater than the width of the first photographing area in the horizontal direction.

A gap in the horizontal direction between the second straight sections of the pair of first detour sections may be greater than the width of the first photographing area in the horizontal direction.

A first gap in the horizontal direction between the pair of first straight sections may be less than a length of one side of the camera module, and a second gap in the horizontal direction between the pair of first detour sections may be greater than the length of the one side of the camera module.

The second gap in the horizontal direction between the pair of first detour sections may be determined in consideration of a vertical distance between the camera module and the grill heater, a width of the cooking chamber, and a height of the cooking chamber.

The second photographing area may cover a plane size of a middle height of the cooking chamber.

The cooking device according to an embodiment of the disclosure may further include a pair of lighting modules disposed respectively on both sides of the camera module above the grill heater and having a light irradiation area that widens downwards to radiate light toward the inside of the cooking chamber.

The grill heater may further include a pair of second detour sections bypassing each lighting module among the pair of lighting modules, at least a portion of each of which extends in a direction different from the front-back direction to bypass the light irradiation area at a height corresponding to the grill heater.

The grill heater may include a pair of third straight sections each extending in the front-back direction and being respectively disposed between a second straight section in the pair of first detour sections and a lighting module among the pair of lighting modules, and a gap in the horizontal direction between a second straight section in the pair of first detour sections and a nearest third straight section among the pair of third straight sections may be less than gap in the horizontal direction between the pair of first straight sections.

The main body may include an electrical chamber provided above the cooking chamber to be separated from the cooking chamber, and the camera module may include a camera disposed in the electrical chamber to face the cooking chamber, a first glass provided in the upper portion of the cooking chamber to block transfer of heat inside the cooking chamber to the camera, a second glass provided between the camera and the first glass to block transfer of the heat to the camera, and a third glass provided between the camera and the second glass to block transfer of the heat to the camera.

A cooking device according to an embodiment of the disclosure includes a main body, a cooking chamber inside the main body, a door provided in a front portion of the main body to open and close the cooking chamber, a grill heater provided in an upper portion of the cooking chamber to heat the inside of the cooking chamber, the grill heater including a plurality of straight sections arranged in parallel with each other and a plurality of curved sections connecting the plurality of straight sections to each other, a camera module disposed above the grill heater to photograph the inside of the cooking chamber, a first lighting module disposed on a first side of the camera module above the grill heater and configured to radiate light toward the inside of the cooking chamber, and a second lighting module disposed on a second side of the camera module located opposite to the first side of the camera module above the grill heater and configured to radiate light toward the inside of the cooking chamber.

Portions of at least some of the plurality of straight sections and portions of at least some of the plurality of curved sections may be detour sections bypassing a photographing area of the camera module, a first light irradiation area of the first lighting module, and a second light irradiation area of the second lighting module so that the grill heater does not interfere with the photographing area of the camera module, the first light irradiation area of the first lighting module, and the second light irradiation area of the second lighting module.

The plurality of straight sections may include first straight sections spaced apart from each other by a first gap, and second straight sections adjacent to the camera module or the first or second lighting module and arranged by second gaps different from the first gap.

The first gap may be less than a length of one side of the camera module.

A second gap between second straight sections adjacent to the camera module among the second gaps may be greater than the first gap.

The second gap between the second straight sections adjacent to the camera module among the second gaps may be determined according to a vertical distance between the camera module and the grill heater, a width of the cooking chamber, and a height of the cooking chamber.

The first gap may be less than a length of one side of the first lighting module or the second lighting module.

A second gap between second straight sections adjacent to each of the first and second lighting modules among the second gaps may be greater than the first gap.

A second gap between second straight sections arranged between the camera module and each of the first and second lighting modules among the second gaps may be less than the first gap.

The camera module may be disposed along a center line of an upper portion of the cooking chamber in a front-back direction.

The first and second lighting modules may be disposed in alignment with the camera module.

The camera module may be disposed close to the door at the center line.

The main body may include an electrical chamber provided above the cooking chamber to be separated from the cooking chamber, and the camera module may include a camera disposed in the electrical chamber to face the cooking chamber, a first glass provided in the upper portion of the cooking chamber to block transfer of heat inside the cooking chamber to the camera, a second glass provided between the camera and the first glass to block transfer of the heat to the camera, and a third glass provided between the camera and the second glass to block transfer of the heat to the camera.

A radiation angle at which the first and second lighting modules radiate light may be 80° or more.

The photographing area of the camera module may cover a plane size of a middle height of the cooking chamber.

Each of the light irradiation area of the first lighting module and the light irradiation area of the first lighting module may cover at least a half the plane size of the middle height of the cooking chamber.

A capacity of the cooking chamber may be 80 liter or more.

In the cooking device according to an embodiment, the quality of a captured image of food may be improved through an avoidance design in which a shadow does not occur when the grill heater covers the camera module or the lighting modules.

The invention claimed is:

1. A cooking device comprising:
a main body;
a cooking chamber inside the main body;
a door provided in a front portion of the main body to open and close the cooking chamber;
a grill heater provided in an upper portion of the cooking chamber to heat an inside of the cooking chamber; and
a camera module disposed above the grill heater and having a photographable photographing area that widens downwards to photograph the inside of the cooking chamber,
wherein the grill heater comprises:
a pair of first straight sections each extending in a front-back direction and being spaced apart from each other in a horizontal direction perpendicular to the front-back direction, and
a pair of first detour sections respectively extending from the pair of first straight sections so as to bypass a photographing area at a height corresponding to the grill heater, each first detour section of the pair of first detour sections including:

a curved section extending from a first straight section among the pair of first straight sections in a direction angled from the front-back direction in which the pair of first straight sections extend, and a second straight section extending from the curved section in a direction parallel to the front-back direction in which the pair of first straight sections extend, and at least one of the first straight sections extends in a direction that passes through the photographing area that is bypassed by the pair of first detour sections.

2. The cooking device of claim 1, wherein the photographing area comprises a first photographing area formed at a height corresponding to the grill heater, and a second photographing area formed at a mid-height of the cooking chamber and wider than the first photographing area, and a first gap in the horizontal direction between the pair of first straight sections is less than a width of the first photographing area in the horizontal direction.

3. The cooking device of claim 2, wherein a second gap in the horizontal direction between the pair of first detour sections is greater than the width of the first photographing area in the horizontal direction.

4. The cooking device of claim 3, wherein a gap in the horizontal direction between the second straight sections of the pair of first detour sections is greater than the width of the first photographing area in the horizontal direction.

5. The cooking device of claim 1, wherein a first gap in the horizontal direction between the pair of first straight sections is less than a length of one side of the camera module, and a second gap in the horizontal direction between the pair of first detour sections is greater than the length of the one side of the camera module.

6. The cooking device of claim 1, wherein a gap in the horizontal direction between the pair of first detour sections is determined in consideration of a vertical distance between the camera module and the grill heater, a width of the cooking chamber, and a height of the cooking chamber.

7. The cooking device of one of claim 2, wherein the second photographing area covers a plane size of a middle height of the cooking chamber.

8. The cooking device of claim 1, further comprising a pair of lighting modules disposed respectively on both sides of the camera module above the grill heater and having a light irradiation area that widens downwards to radiate light toward the inside of the cooking chamber, wherein the grill heater further comprises a pair of second detour sections bypassing each lighting module among the pair of lighting modules, at least a portion of each of which extends in a direction different from the front-back direction to bypass the light irradiation area at the height corresponding to the grill heater.

9. The cooking device of claim 8, wherein the grill heater comprises a pair of third straight sections each extending in the front-back direction and being respectively disposed between a second straight section in the pair of first detour sections and a lighting module among the pair of lighting modules, and a gap in the horizontal direction between a second straight section in the pair of first detour sections and a nearest third straight section among the pair of third straight sections is less than a gap in the horizontal direction between the pair of first straight sections.

10. The cooking device of claim 1, wherein the main body comprises an electrical chamber provided above the cooking chamber to be separated from the cooking chamber, and the camera module comprises:

a camera disposed in the electrical chamber to face the cooking chamber;

a first glass provided in the upper portion of the cooking chamber to block transfer of heat inside the cooking chamber to the camera;

a second glass provided between the camera and the first glass to block transfer of the heat to the camera; and a third glass provided between the camera and the second glass to block transfer of the heat to the camera.

11. A cooking device comprising:

a main body;

a cooking chamber inside the main body;

a door provided in a front portion of the main body to open and close the cooking chamber;

a grill heater provided in an upper portion of the cooking chamber to heat an inside of the cooking chamber, wherein the grill heater comprises a plurality of straight sections arranged in parallel with each other and a plurality of curved sections connecting the plurality of straight sections to each other;

a camera module disposed above the grill heater to photograph the inside of the cooking chamber;

a first lighting module disposed on a first side of the camera module above the grill heater and configured to radiate light toward the inside of the cooking chamber; and a second lighting module disposed on a second side of the camera module located opposite to the first side of the camera module above the grill heater and configured to radiate light toward the inside of the cooking chamber, wherein portions of at least some of the plurality of straight sections and portions of at least some of the plurality of curved sections are detour sections bypassing a photographing area of the camera module, a light irradiation area of the first lighting module, and a light irradiation area of the second lighting module so that the grill heater does not interfere with the photographing area of the camera module, the light irradiation area of the first lighting module, and the light irradiation area of the second lighting module, and at least one straight section among the plurality of straight sections extends in a direction that passes through the photographing area that is bypassed by the detour sections.

12. The cooking device of claim 11, wherein the plurality of straight sections comprise:

first straight sections spaced apart from each other by a first gap; and second straight sections adjacent to the camera module, the first lighting module, or the second lighting module and spaced apart from each other by second gaps different from the first gap.

13. The cooking device of claim 12, wherein the first gap is less than a length of one side of the camera module, and a second gap between second straight sections adjacent to the camera module among the second gaps is greater than the first gap.

14. The cooking device of claim 12, wherein the first gap is less than a length of one side of the first lighting module or the second lighting module.

15. The cooking device of claim 12, wherein a second gap between second straight sections adjacent to each of the first and second lighting modules among the second gaps is greater than the first gap.

16. The cooking device of claim 12, wherein a second gap between second straight sections arranged between the camera module and each of the first and second lighting modules among the second gaps is less than the first gap.

17. The cooking device of claim 11, wherein the camera module is disposed at a center line of an upper portion of the cooking chamber in a front-back direction to be closer to the door than to a rear of the cooking chamber.

18. The cooking device of claim 11, wherein the first and second lighting modules are disposed in alignment with the camera module.

19. The cooking device of claim 11, wherein the main body comprises an electrical chamber provided above the cooking chamber to be separated from the cooking chamber, and the camera module comprises:

a camera disposed in the electrical chamber to face the cooking chamber;

a first glass provided in the upper portion of the cooking chamber to block transfer of heat inside the cooking chamber to the camera;

a second glass provided between the camera and the first glass to block transfer of the heat to the camera; and a third glass provided between the camera and the second glass to block transfer of the heat to the camera.

20. The cooking device of claim 11, wherein the photographing area of the camera module covers a plane size of a middle height of the cooking chamber.

* * * * *